July 28, 1931.   N. SKILLMAN   1,816,661
TRANSMISSION HOUSING
Filed May 12, 1928
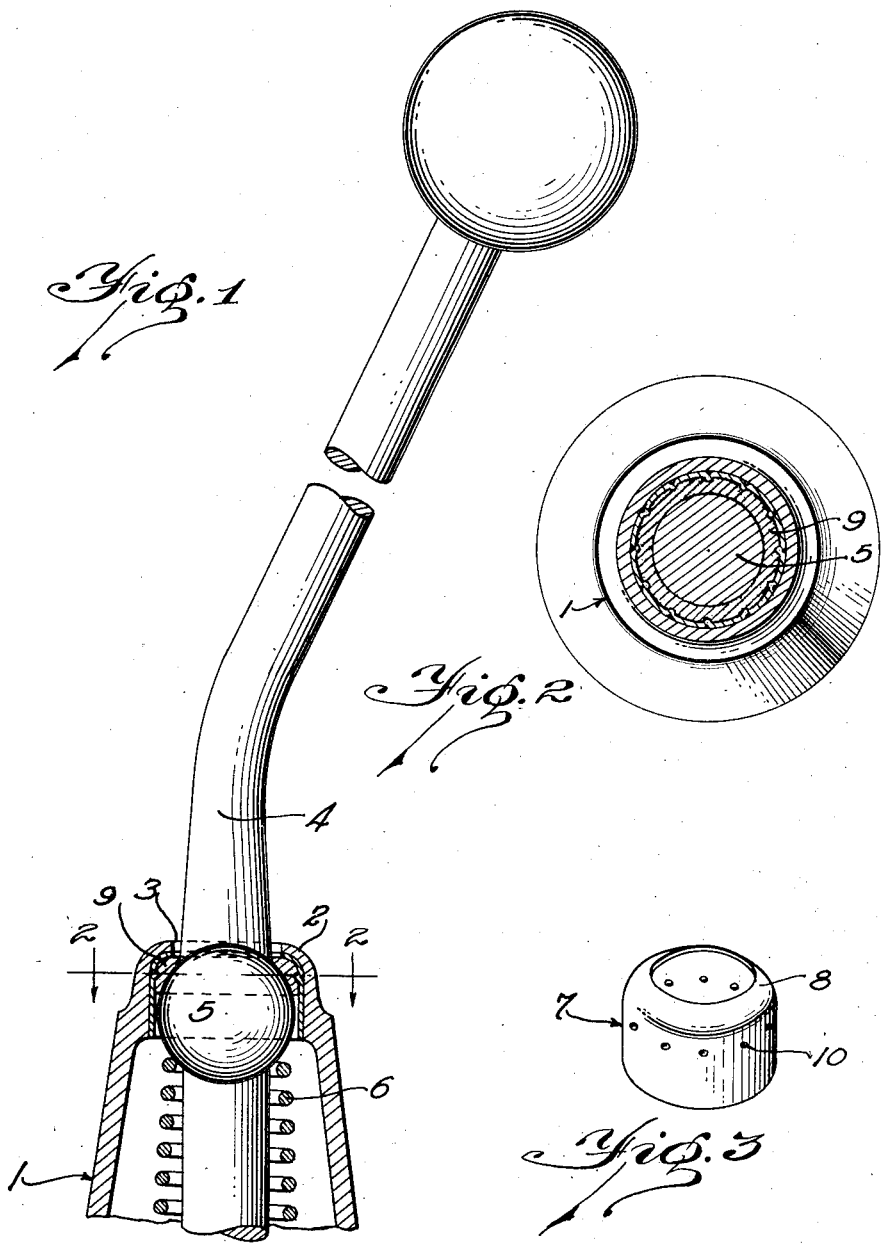
INVENTOR.
Newton Skillman.
BY
ATTORNEY.

Patented July 28, 1931

1,816,661

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

TRANSMISSION HOUSING

Application filed May 12, 1928. Serial No. 277,238.

This invention relates to a transmission housing, and has to do particularly with a combined transmission housing and a self-lubricating, self-aligning bearing and washer member for direct contact with the shifter arm.

Heretofore in transmission housing and shifter arm construction considerable difficulty has been experienced in maintaining a suitable bearing joint between the shifter arm and the housing, both as to prevention of lubricant from forcing its way through the upper opening of the housing and from rattling and wearing of the parts.

It is the object of the present invention to provide an extremely compact, simple and inexpensive bearing member adapted to fit within the transmission housing in a novel manner, and being provided with a preformed bushing of lubricant impregnated fibrous material adapted to directly contact with the spherical surface of the shifter arm, and thus serve as a washer to provide a positive seal for the top portion of the housing, as an anti-rattler, as a self-lubricating member and to take up end thrust of the shifter arm.

In the drawings:

Fig. 1 is an elevation, partly in section, of the upper portion of a transmission housing and shifter arm construction embodying the present invention.

Fig. 2 is a section taken on line 2—2 of Fig. 1.

Fig. 3 is a perspective detail view of the bearing unit adapted to be positioned within the upper end of the transmission housing.

Illustrating the present invention I have shown the same as embodied in a conventional transmission housing and shifter arm construction, but it will be understood that said housing and shifter arm may vary considerably in design and arrangement and still embody the features of the invention.

The transmission housing may be generally designated 1 and the upper end thereof is preferably annular and cup-shaped, as at 2, at the same time providing a suitable opening 3 to permit free movement of a standard shifter arm 4.

The shifter arm 4 is preferably provided with the usual spherical member 5 and a coil spring 6, suitably supported, and exerting a force upwardly against the ball 5. Adapted to be positioned within the upper cylindrical but cup-shaped end of the housing 1 is a bearing member which may be generally designated 7. This member is preferably of the same shape as the upper end of the housing and is of general cylindrical shape with the exception of a turned-in flange 8.

Positioned within the bearing member 7 and directly supported by the turned-in portion 8 is a preformed lubricant impregnated annular bushing member 9. This member 9 is preferably formed by placing a strip of lubricant impregnated fibrous material within the outer shell of the bearing and compressing or spinning the same into shape whereby to provide a preformed, spherical surface for directly contacting with the ball 5 of the shifter arm. This bushing 9 may be also formed of fairly highly compressed lubricant impregated fibrous material, the point being, that the bearing surface of said bushing is spherical and preformed in shape.

The preformed bushing 9 is preferably held in place by means of suitable indentations 10 formed in the surface of the shell 7, and such indentations may be placed in the shell either before or after the insertion of the bushing 9, according to the particular material used, and method of preforming the same.

It will thus be seen that I have provided an extremely compact and simple transmission housing and bearing therefor, which bearing acts directly against the spherical member 5 of the shifter lever as a permanent lubricant member, an end thrust member and an anti-rattler member, the latter function being particularly desirable and being obtained due to the fact that the spring 6 will constantly force the spherical member 5 against the resilient fibrous bushing 9. This novel combination will materially accelerate the ease and quietness of shifting, and will also serve as a positive seal in preventing any lubricant from being forced up around the shifter arm.

What I claim is:

1. In a transmission housing of the type having a shifter arm extending through the upper end thereof, and a member on the lever having a spherical bearing surface, an outer cylindrical bearing sleeve having an inturned upper edge positioned within the housing, and a bushing of lubricant impregnated fibrous material, preformed to provide a spherical bearing surface, positioned within the upper end of said bearing member and contacting directly with said spherical bearing surface of said member on the shifter arm.

2. In a transmission housing of the type having a shifter arm and extending through the upper end thereof, and a member on the lever having a spherical bearing surface, an outer cylindrical bearing sleeve having an inturned upper edge positioned within the housing, and an annular bushing of lubricant impregnated fibrous material, preformed to provide a spherical bearing surface, positioned within the upper end of said bearing member and contacting directly with said spherical bearing surface of said member on the shifter arm.

3. In a transmission housing of the type having a shifter arm extending through the upper end thereof, and a member on the lever having a spherical bearing surface, an outer cylindrical bearing sleeve having an inturned upper edge positioned within the housing, and an annular bushing of lubricant impregnated fibrous material, preformed to provide a spherical bearing surface, positioned within the upper end of said bearing member and contacting directly with said spherical bearing surface of said member on the shifter arm, said bearing member being distorted to secure said preformed fibrous bushing in position.

4. In a transmission housing of the type having a shifter arm extending through the upper end thereof, and a member on the lever having a spherical bearing surface, an outer cylindrical bearing sleeve having an inturned upper edge positioned within the housing, and an annular bushing of lubricant impregnated fibrous material, preformed to provide a spherical bearing surface, positioned within the upper end of said bearing member and contacting directly with said spherical bearing surface of said member on the shifter arm, said bearing member being distorted to secure said preformed fibrous bushing in position, and means for resiliently forcing said member with the spherical bearing surface against said bushing.

5. In combination with a transmission housing and shifter arm therefor of the type having a spherical bearing member adjacent the upper end of the housing, an outer bearing sleeve having an inturned edge positioned within the housing, and a bushing of lubricant impregnated fibrous material positioned within and adjacent the inturned edge of said bearing member and contacting directly with one end of said spherical bearing surface, and resilient means for pressing said member on the lever against said bushing.

6. In combination with a transmission housing and shifter arm therefor of the type having a spherical member adjacent the upper end of the housing, a preformed lubricant impregnated bearing member of fibrous material positioned within the upper portion of the housing and having a spherical bearing surface directly engaging a portion of the upper end of the spherical member, and resilient means engaging the opposite portion of said spherical member for forcing the same into bearing contact with said bearing member.

7. In a transmission housing of the type having a shifter arm extending through the upper end thereof, and a member on the lever having a spherical bearing surface, an outer cylindrical bearing sleeve positioned within the housing and having an inturned end and a bushing of lubricant impregnated fibrous material positioned in said bearing member adjacent the inturned end, and means for resiliently forcing said member on the lever against said bushing, said bushing forming the only bearing surface for said lever and being so positioned within the bearing member and housing as to form an end thrust member and a sealing member.

In testimony whereof I affix my signature.

NEWTON SKILLMAN.